United States Patent
Lin et al.

(10) Patent No.: US 9,702,889 B2
(45) Date of Patent: Jul. 11, 2017

(54) MICRO-ELECTRO-MECHANICAL SYSTEM (MEMS) DEVICE

(71) Applicants: Shih-Chieh Lin, Kaohsiung (TW); Chiung-Cheng Lo, Miaoli (TW)

(72) Inventors: Shih-Chieh Lin, Kaohsiung (TW); Chiung-Cheng Lo, Miaoli (TW)

(73) Assignee: RICHTEK TECHNOLOGY CORPORATION, Chupei, Hsinchu (TW)

(*) Notice: Subject to any disclaimer, the term of this patent is extended or adjusted under 35 U.S.C. 154(b) by 107 days.

(21) Appl. No.: 14/742,393

(22) Filed: Jun. 17, 2015

(65) Prior Publication Data

US 2016/0370397 A1    Dec. 22, 2016

(51) Int. Cl.
| | |
|---|---|
| *G01P 15/08* | (2006.01) |
| *G01C 19/56* | (2012.01) |
| *G01P 1/00* | (2006.01) |
| *G01P 15/125* | (2006.01) |
| *G01P 15/18* | (2013.01) |

(52) U.S. Cl.
CPC ............ *G01P 1/003* (2013.01); *G01P 15/125* (2013.01); *G01P 15/18* (2013.01); *G01P 2015/0814* (2013.01); *G01P 2015/0822* (2013.01); *G01P 2015/0871* (2013.01)

(58) Field of Classification Search
CPC ................. G01P 2015/0871; G01P 2015/0814
See application file for complete search history.

(56) References Cited

U.S. PATENT DOCUMENTS

| | | |
|---|---|---|
| 5,542,295 A | 8/1996 | Howe et al. |
| 6,360,605 B1 | 3/2002 | Pinter et al. |
| 7,000,473 B2 | 2/2006 | Vandemeer et al. |
| 2011/0174074 A1* | 7/2011 | Li ...................... G01C 19/5755 73/504.14 |
| 2013/0255377 A1* | 10/2013 | Furuhata ............ G01C 19/5719 73/504.12 |

* cited by examiner

*Primary Examiner* — John Chapman, Jr.
(74) *Attorney, Agent, or Firm* — Tung & Associates

(57) ABSTRACT

The present invention discloses a MEMS device. The MEMS device includes a substrate, a proof mass, a frame spring and an anchor. The proof mass is connected to the substrate through the frame spring and the anchor. The proof mass includes a proof mass body, a proof mass frame surrounding the proof mass body, a linking element connecting the proof mass body to the proof mass frame, and a stopper between the proof mass body and the proof mass frame in a displacement direction to limit the displacement of the proof mass body. The stopper is connected to the proof mass frame as a part of the proof mass and contributes to the mass quantity of the proof mass.

16 Claims, 14 Drawing Sheets

MICRO-ELECTRO-MECHANICAL SYSTEM (MEMS) DEVICE

BACKGROUND OF THE INVENTION

Field of Invention

The present invention relates to a micro-electron-mechanical system (MEMS) device; particularly, it relates to such MEMS device having its stopper anchored to a proof mass frame which is apart of a proof mass. Therefore, while the stopper provides the function to constraint the displacement of a main body of the proof mass, the stopper also contributes to increase the mass quantity of the proof mass so as to increase the sensitivity of the MEMS device.

Description of Related Art

MEMS devices, for example inertial sensors, accelerometers, gyroscopes, etc., include a suspended structure which is movable relatively to a fixed structure. The suspended structure includes a proof mass and the proof mass includes a movable electrode. The fixed structure includes a fixed electrode. The relative movement between the suspended structure and the fixed structure causes a capacitance change between the movable electrode and the fixed electrode. This capacitance change can be read out as a sensing signal indicating the movement.

It is preferred that the suspended structure does not move beyond a certain range. However, due to an external event, for example an impact or shock, the suspended structure can make a sudden undesired movement which may cause a damage of the MEMS device. For this reason, stopper structures (generally known as "stoppers") are provided in the MEMS device.

Conventionally, stoppers are provided as apart of the fixed structure, which is fixed to a substrate of the MEMS device. U.S. Pat. No. 5,542,295, U.S. Pat. No. 6,360,605 and U.S. Pat. No. 7,000,473 are examples of such stoppers. However, such conventional design of stoppers consumes space but does not increase the sensitivity of the MEMS device.

In view of the above drawback in the prior art, the present invention proposes a MEMS device having its stopper anchored to a proof mass frame which is apart of a proof mass. Therefore, while the stopper provides the function to constraint the displacement of a main body of the proof mass, the stopper also contributes to increase the mass quantity of the proof mass so as to increase the sensitivity of the MEMS device.

SUMMARY OF THE INVENTION

From one perspective, the present invention provides a MEMS device, comprising: a substrate; a proof mass suspended above the substrate and is movable relatively to the substrate, wherein the proof mass includes: at least one proof mass body; a proof mass frame surrounding the proof mass body; at least one linking element connecting the proof mass body to the proof mass frame, the linking element providing a spring function so that the proof mass body is movable relatively to the proof mass frame in a displacement direction; and at least one stopper between the proof mass body and the proof mass frame in the displacement direction to limit the displacement of the proof mass body, wherein the stopper is connected to the proof mass frame or the proof mass body as a part of the proof mass and contributes to the mass quantity of the proof mass; at least one frame spring connected to the proof mass frame; and at least one anchor connecting one or more of the at least one frame spring to the substrate.

In one embodiment, the stopper is wholly made of a resilient material, or apart of the stopper which is connected to the proof mass frame or the proof mass body is made of a resilient material.

In one embodiment, the stopper as a whole, or a part of the stopper which is connected to the proof mass frame or the proof mass body, provides an impact buffering function by a shape of the stopper or a shape of the part of the stopper.

In one embodiment, the anchor is located outside the proof mass frame.

In one embodiment, the anchor is located inside the proof mass frame.

In one embodiment, the anchor is located below the proof mass body.

In one embodiment, the MEMS device further includes a buffer spring between the stopper and the proof mass frame in the displacement direction.

In one embodiment, the MEMS device further includes a buffer spring between the stopper and the proof mass body in the displacement direction.

In one embodiment, the MEMS device further includes a first buffer spring between the stopper and the proof mass frame in the displacement direction, and a second buffer spring between the stopper and the proof mass body in the displacement direction.

In one embodiment, the MEMS device comprises at least two proof mass bodies, and the MEMS device further comprises at least another stopper between the two proof mass bodies in the displacement direction.

In one embodiment, the stopper is connected to a side of the proof mass frame or a side of the proof mass body which is not parallel to the displacement direction.

In one embodiment, at least one of the linking elements includes a first part connected to the proof mass frame and a plurality of second parts connected to the proof mass body.

In one embodiment, at least one of the second parts provides a spring function, and the first part is relatively more rigid than this second part.

In one embodiment, at least one of the second parts extends between the stopper and the proof mass frame.

In one embodiment, the proof mass body has an internal space, and the stopper extends in the internal space.

From another perspective, the present invention provides a MEMS device, comprising: a substrate; a proof mass suspended above the substrate and is movable relatively to the substrate, wherein the proof mass includes: at least two proof mass bodies; a proof mass frame surrounding the proof mass bodies; at least two linking elements connecting the proof mass bodies to the proof mass frame, respectively, the linking elements providing a spring function so that the proof mass bodies are movable relatively to the proof mass frame in a displacement direction; and at least one stopper between the proof mass bodies in the displacement direction to limit the displacements of the proof mass bodies, wherein the stopper is connected to the proof mass frame as a part of the proof mass and contributes to the mass quantity of the proof mass; at least one frame spring connected to the proof mass frame; and at least one anchor connecting one or more of the at least one frame spring to the substrate.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be better understood with regard to the detailed description of the embodiments below, with reference to the drawings. The drawings as referred to throughout the description of the present invention are for illustration only, to show the interrelations between the structures or components, but not drawn according to actual scale.

Figure 1:
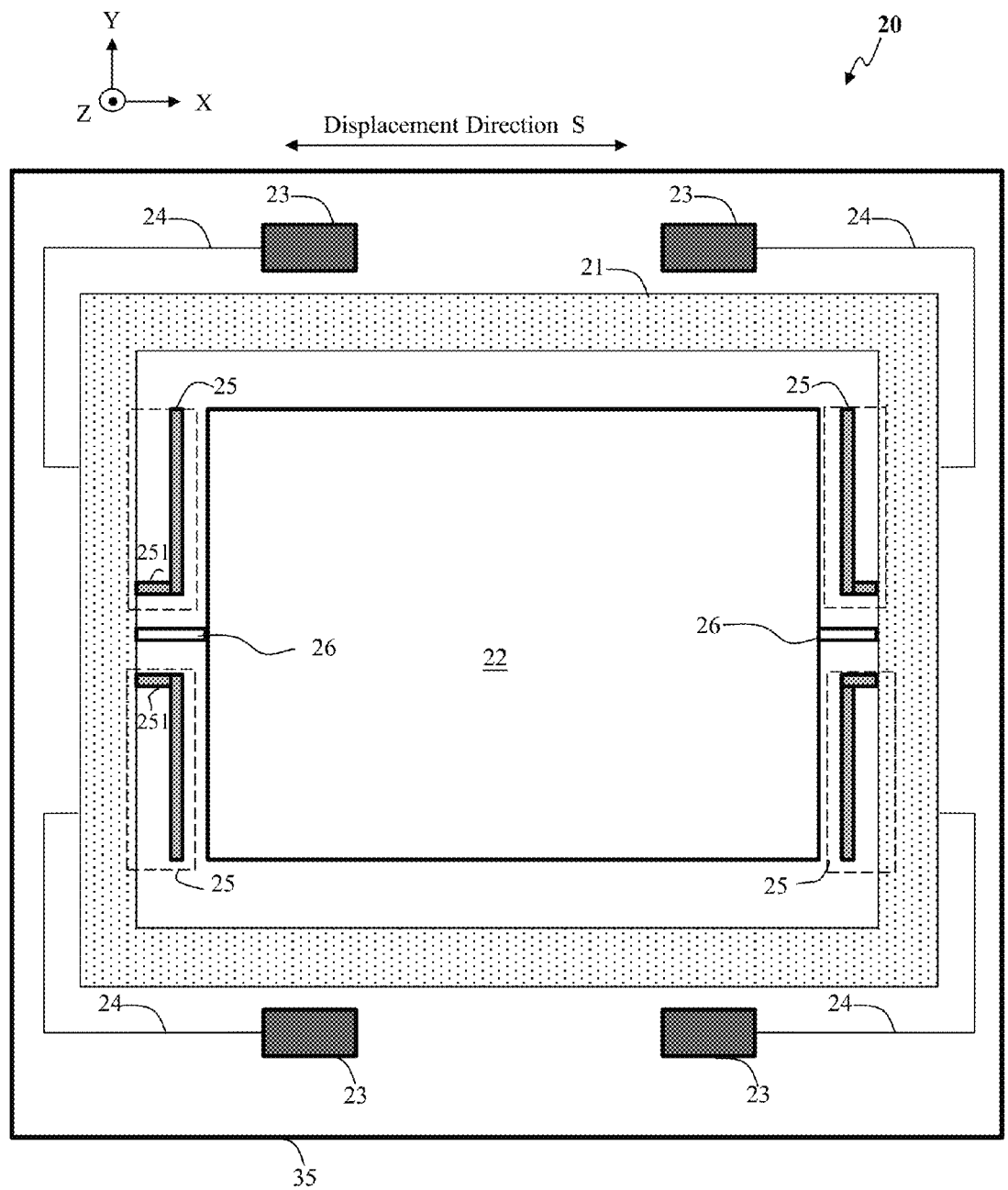
FIG. 1 shows a schematic top view of a MEMS device according to an embodiment of the present invention.

Please refer to FIG. 1, which shows a schematic top view of a MEMS device 20 according to an embodiment of the present invention. The MEMS device 20 of this embodiment comprises a substrate 35, anchors 23, frame springs 24, and a proof mass which includes a proof mass frame 21, a proof mass body 22, stoppers 25 and linking elements 26. The proof mass is suspended above the substrate 35 and is movable relatively to the substrate 35. Note that the numbers of the anchors 23, the frame springs 24, the stoppers 25 and the linking elements 26 described and shown in this embodiment are for illustrative purpose only, but not for limiting the scope of the present invention. In other embodiments, the numbers of the anchor 23 and the frame spring 24 can be changed. The fixed electrode of the fixed structure is not shown for simplicity of the figure because the fixed electrode is irrelevant to the present invention.

Figure 2:
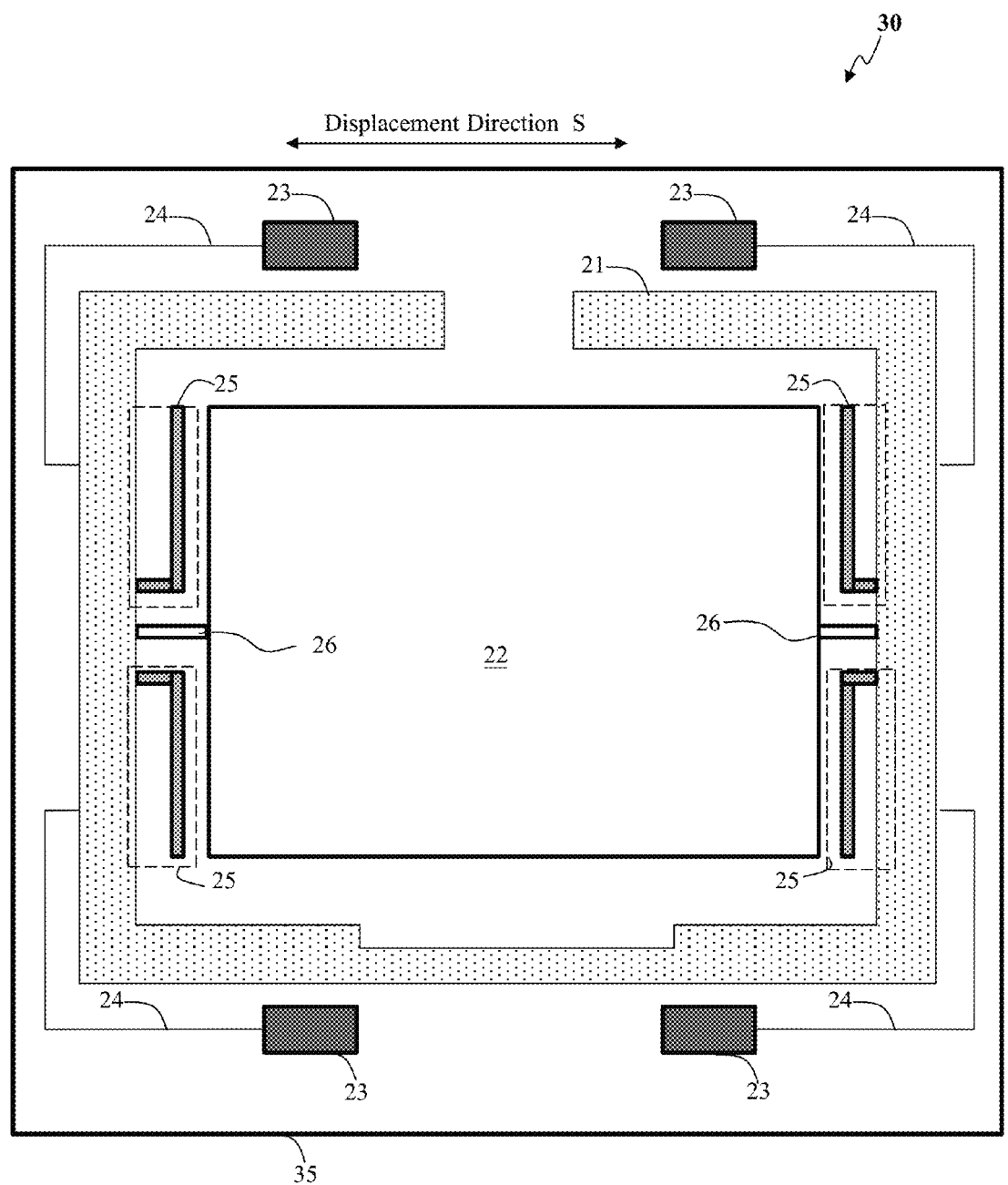
FIG. 2 shows a schematic top view of a MEMS device according to another embodiment of the present invention.

The proof mass frame 21 surrounds the proof mass body 22. That is, from the top view of FIG. 1, the proof mass body 22 is located inside the proof mass frame 21. The proof mass frame 21 is shown to be a continuous structure in FIG. 1, but the present invention is not limited to this. Referring to FIG. 2, in the MEMS device 30, the proof mass frame 21 can have a discontinuous structure, and, the proof mass frame 21 does not have to maintain a uniform width at each side. Referring back to FIG. 1, in this embodiment, the proof mass frame 21 is connected to the proof mass body 22 via at least two linking elements 26, respectively. Each linking element 26 provides a spring function so that the proof mass body 22 can move relatively to the proof mass frame 21. In one embodiment, the linking element 26 provides the spring function by its shape design, such as but not limited to an S-shape or a winding shape. In another embodiment, the linking element 26 can be made of a resilient material. Preferably, if the MEMS device 30 is an out-of-plane sensor or a multi-dimensional sensor including an out-of-plane sensing function, the proof mass body 22 can rotate along an axis formed by the linking elements 26 to sense a movement in an out-of-plane direction (i.e., Z direction perpendicular to the X and Y directions shown in FIG. 1). In another embodiment, if the MEMS device 30 is an in-plane sensor or a multi-dimensional sensor including an in-plane sensing function, the proof mass body 22 and/or the proof mass frame 21 can form one or more capacitors with corresponding fixed electrode(s) (not shown) on the substrate 35 in one or more in-plane directions (i.e., X and/or Y directions as shown in FIG. 1). Because the proof mass includes the proof mass body 22 and the proof mass frame 21, capacitors can be formed between a fixed electrode (not shown) and the proof mass body 22, or formed between a fixed electrode (not shown) and the proof mass frame 21, depending on the layout design.

Figure 3:
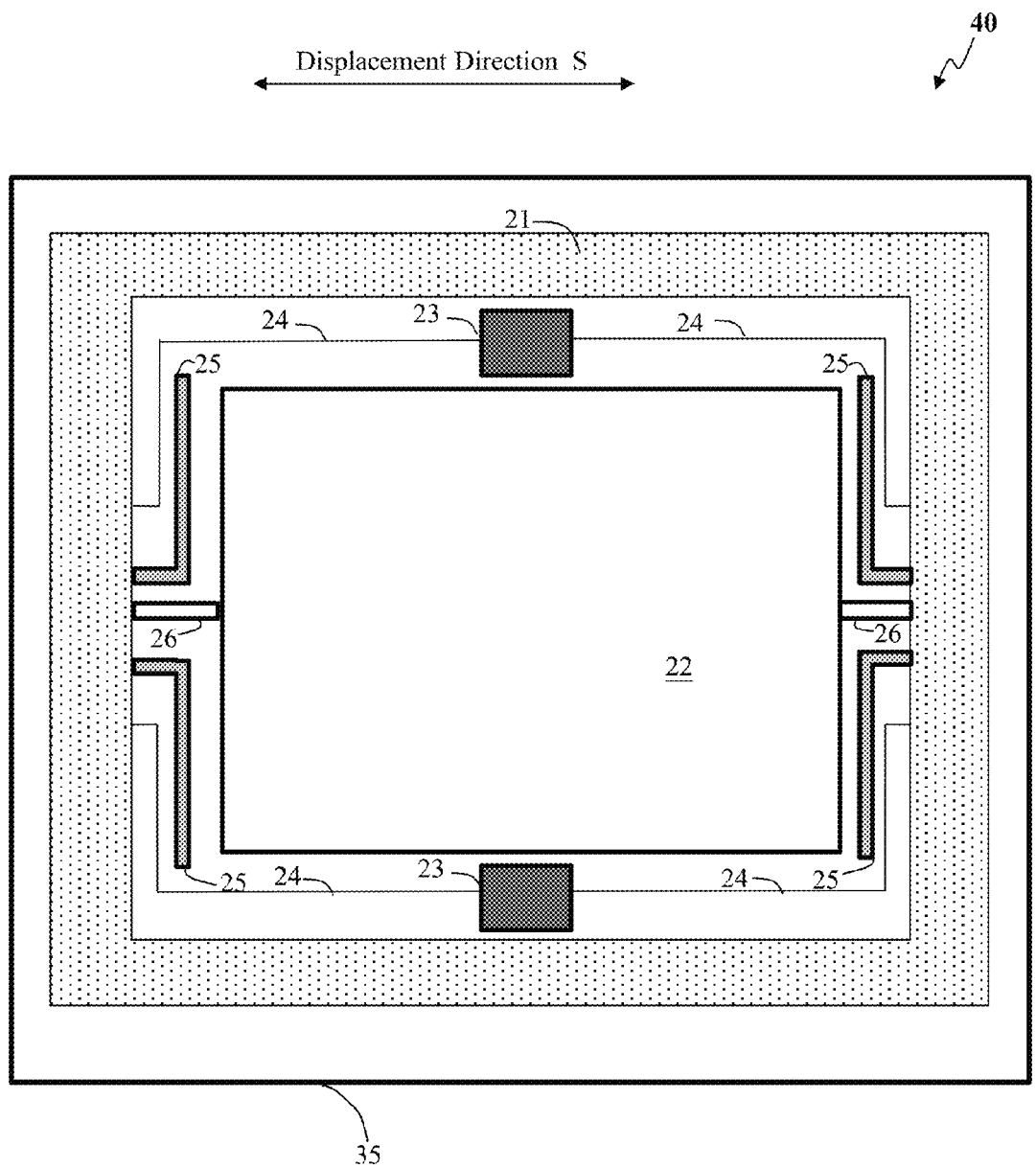
FIG. 3 shows a schematic top view of a MEMS device according to yet another embodiment of the present invention.
Figure 4:
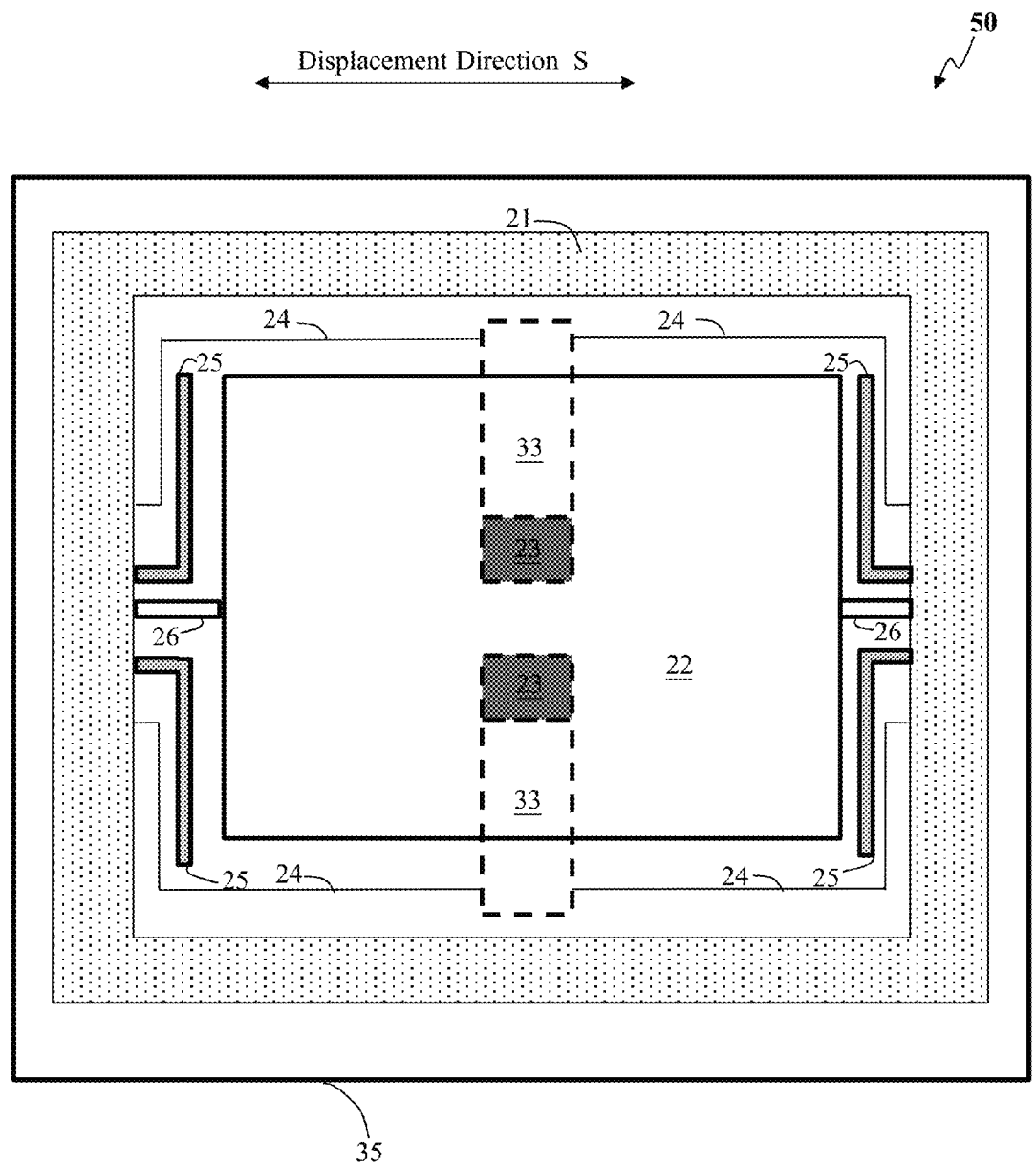
FIG. 4 shows a schematic top view of a MEMS device according to yet another embodiment of the present invention.
Figure 5:
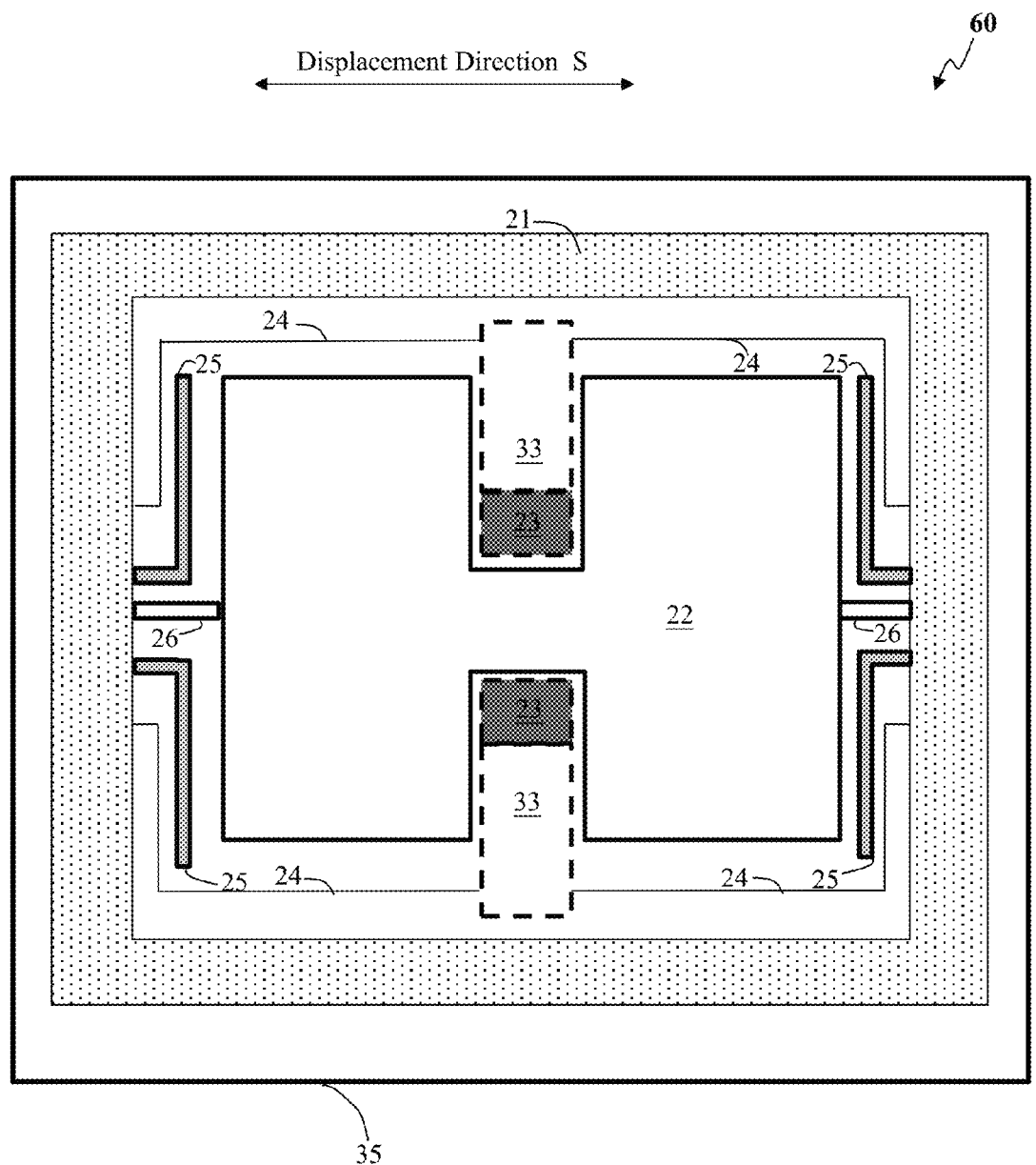
FIG. 5 shows a schematic top view of a MEMS device according to yet another embodiment of the present invention.

The proof mass frame 21 is connected to the substrate 35 through the frame springs 24 and the anchors 23. That is, the frame springs 24 are connected to the proof mass frame 21 and the anchors 23 connect the frame springs 24 to the substrate 35. Hence, the proof mass can move relatively to the substrate 35; the relative movement between the proof mass and the substrate 35 for example can be an in-plane relative movement so that a capacitance of a capacitor formed between a fixed electrode (not shown) and the proof mass changes. In this embodiment, each frame spring 24 is connected to a corresponding anchor 23. In another embodiment, two or more frame spring 24 can be connected to one anchor 23. In this embodiment, the anchors are located outside the proof mass frame 21 from the top view of FIG. 1. In another embodiment, the anchors can be located inside of the proof mass frame 21. FIG. 3 shows a MEMS device 40 according to another embodiment of the present invention, wherein the anchors 23 are located inside the proof mass frame 21 and two or more frame spring 24 are connected to one anchor 23. FIG. 4 shows a MEMS device 50 according to another embodiment of the present invention, wherein the anchors 23 are located under the proof mass body 22. The frame springs 24 are connected to the corresponding anchors 23 through corresponding connecting elements 33. The anchors 23 and the connecting elements 33 have an elevation level lower than the elevation level of the proof mass body 22. FIG. 5 shows a MEMS device 60 according to another embodiment of the present invention, wherein the shape of the proof mass body 22 is modified to accommodate the anchors 23 and the connecting elements 33. In this embodiment, the anchors 23 and the connecting elements 33 do not need to have an elevation level lower than the elevation level of the proof mass body 22.

Referring back to FIG. 1, in order to limit the displacement of the proof mass body 22 along a displacement direction S, the present invention provides stoppers 25 between the proof mass body 22 and the proof mass frame 21 in the displacement direction S. According to the present invention, the stoppers 25 are connected to the proof mass frame 21 (or the proof mass body 22, to be illustrated later by other embodiments) and therefore the stoppers 25 are a part of the proof mass; the stoppers 25 contribute to the mass quantity of the proof mass. The stoppers 25 provide an impact buffering function. In one embodiment, the stopper 25 is wholly made of a resilient material, or, at least a part 251 of the stopper 25 which is connected to the proof mass frame 21 or the proof mass body 22 is made of a resilient material. In another embodiment, the stopper 25 as a whole, or, at least a part 251 of the stopper 25 which is connected to the proof mass frame 21 or the proof mass body 22, provides the impact buffering function by its shape design, such as but not limited to an S-shape or a winding shape. The stopper 25 is preferably connected to a side of the proof mass frame 21 or a side of the proof mass body 22 which is not parallel to the displacement direction S. In this embodiment, the proof mass frame 21 has a rectangular shape, and the upper and lower sides of the proof mass frame 21 are parallel to the displacement direction S. Therefore, preferably, the stoppers 25 are connected to the left and right sides of the proof mass frame 21. However, it is still within the scope of the present invention if the stoppers 25 are connected to the upper and lower sides of the proof mass frame, although less preferred. Note that the proof mass frame 21 does not necessarily have to be a rectangular shape and can be any other shape.

Figure 6:
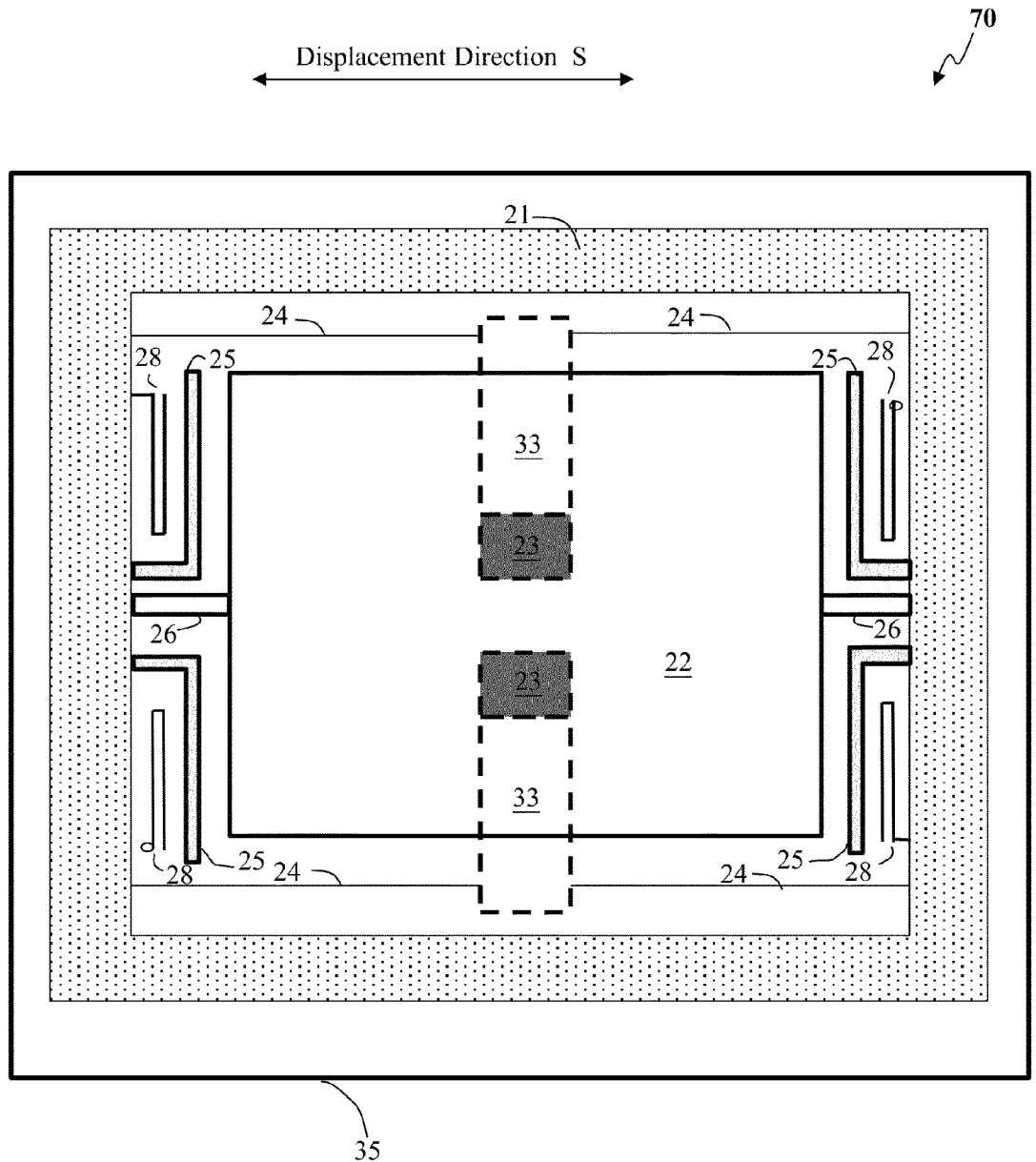
FIG. 6 shows a schematic top view of a MEMS device according to yet another embodiment of the present invention.

Please refer to FIG. 6, which shows a schematic top view of a MEMS device 70 according to another embodiment of the present invention. In this embodiment, a buffer spring 28 is provided between each stopper 25 and the proof mass frame 21 in the displacement direction S. The buffer spring 28 provides a function to further mitigate the impact when the proof mass body 22 hits the stopper 25. The buffer spring 28 for example can be connected to the proof mass frame 21 (as shown by the upper-left and lower-right buffer springs 28) or connected to the substrate 35 (as shown by the upper-right and lower-left buffer springs 28). Note that, the MEMS device 70 is shown to have a structure similar to the structure of the MEMS device 50 in FIG. 4, which is only a non-limiting example. The buffer springs 28 can be provided in other structures such as in the MEMS devices 20, 30, 40 and 60 of FIGS. 1, 2, 3 and 5.

Figure 7:
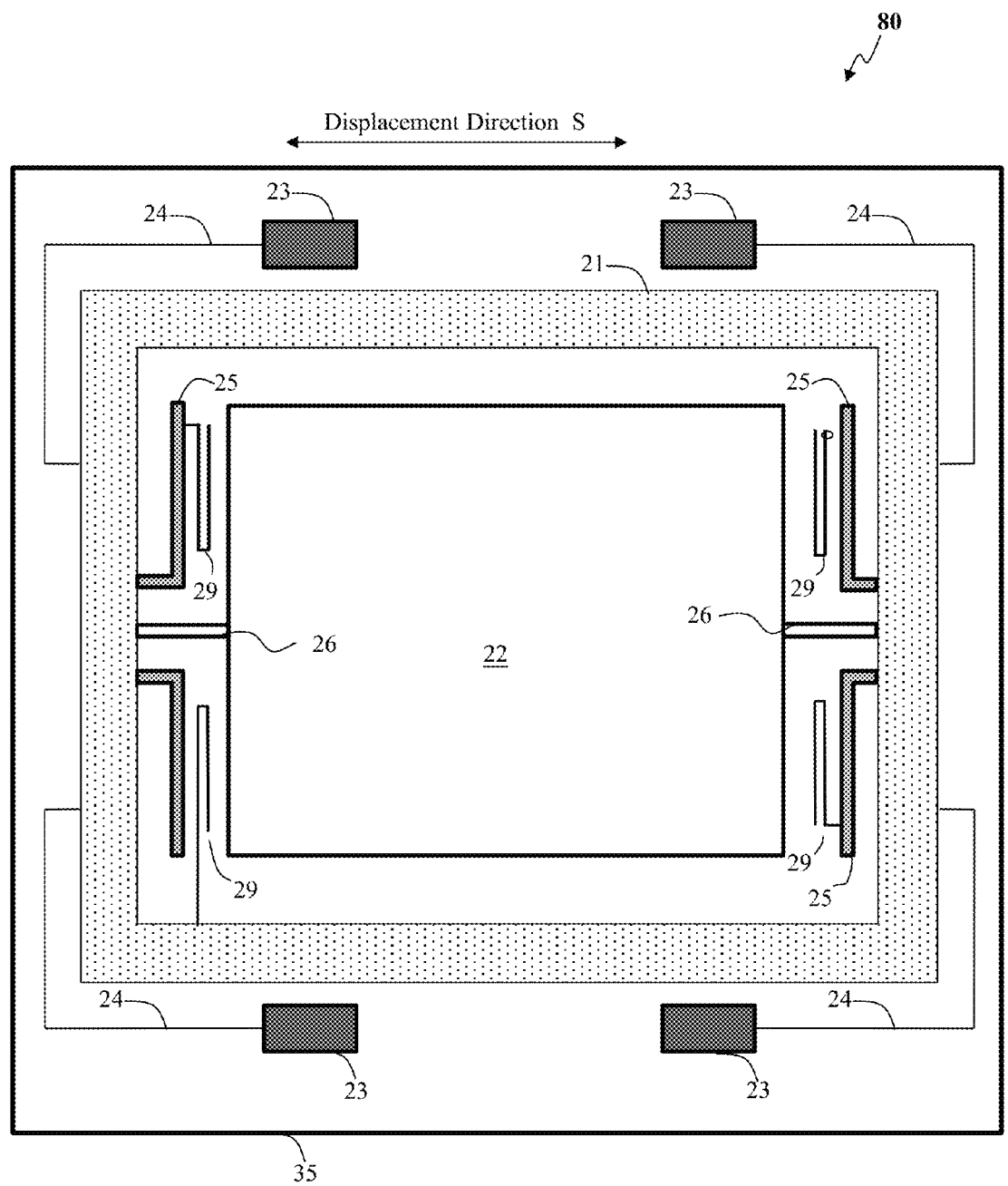
FIG. 7 shows a schematic top view of a MEMS device according to yet another embodiment of the present invention.

Please refer to FIG. 7, which shows a schematic top view of a MEMS device 80 according to another embodiment of the present invention. In this embodiment, a buffer spring 29 is provided between each stopper 25 and the proof mass body 22 in the displacement direction S. The buffer spring 29 provides a function to further mitigate the impact when the proof mass body 22 hits the stopper 25. The buffer spring 29 for example can be connected to the stopper 25 (as shown by the upper-left and lower-right buffer springs 29), or connected to the substrate 35 (as shown by the upper-right buffer spring 29), or connected to the proof mass frame 21 as shown by the lower-left buffer spring 29). Note that, the MEMS device 80 is shown to have a structure similar to the structure of the MEMS device 20 in FIG. 1, which is only a non-limiting example. The buffer springs 29 can be provided in other structures such as in the MEMS devices 30, 40, 50, 60 and 70 of FIGS. 2-6. Moreover, according to the present invention, a MEMS device can include both the buffer springs 29 and the buffer springs 29.

Figure 8:
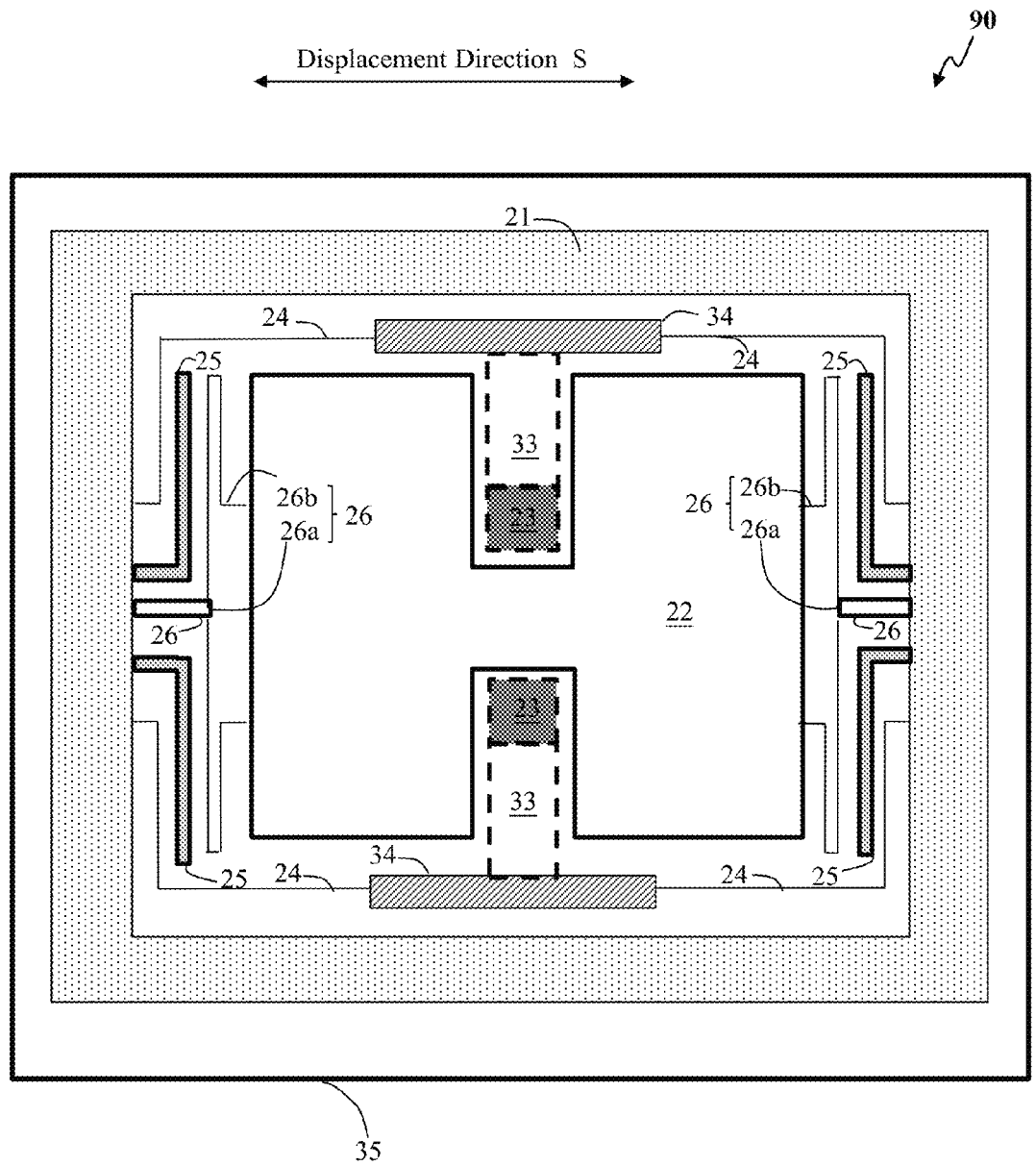
FIG. 8 shows a schematic top view of a MEMS device according to yet another embodiment of the present invention.

Please refer to FIG. 8, which shows a schematic top view of a MEMS device 90 according to another embodiment of the present invention. In this embodiment, each of the linking elements 26 includes a first part 26a connected to the proof mass body 22 and plural second parts 26b connected to the proof mass frame 21. In one embodiment, the first part 26a has the spring function for rotation and the spring function for Y direction, but has less freedom in the X direction; the spring function of X direction is decided by the second parts 26b. By this arrangement, the proof mass body 22 can make an in-plane movement relatively to the proof mass frame 21 (and relatively to the substrate 35). In another embodiment, the proof mass body 22 can also make an out-of-plane movement relatively to the substrate 35, but this out-of-plane movement is not a rotational movement as in the previous embodiments. In one embodiment, the second parts 26b provide the spring function by its shape design. In another embodiment, the second parts 26b can be made of a resilient material.

FIG. 8 also shows that there can be one or more buffering structures 34 connected between the frame springs and the corresponding connecting elements 33. The buffering structures 34 for example can strengthen the structure and/or provide a stopper function in the Y direction (referring to the directions shown in FIG. 1).

Figure 9:
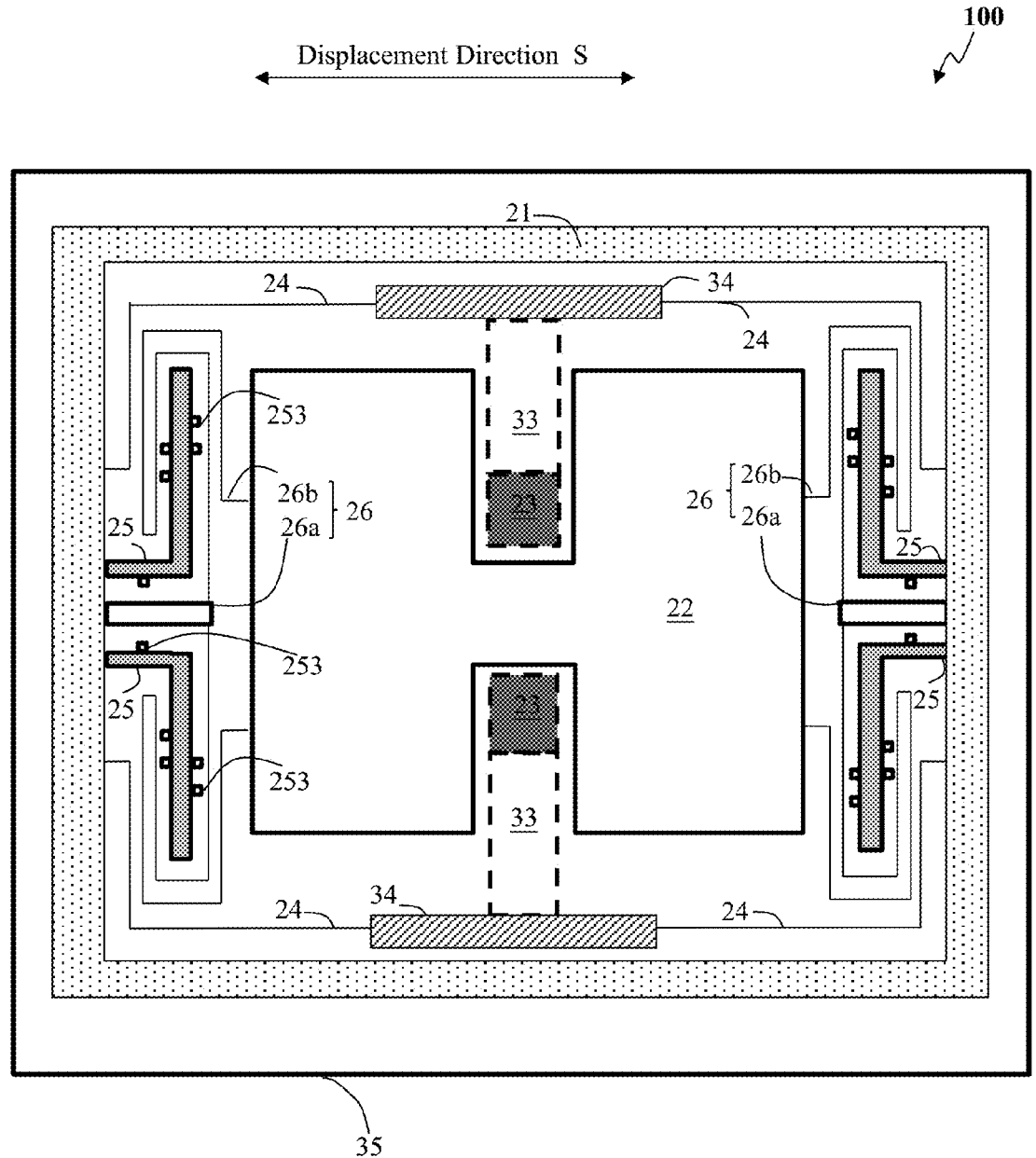
FIG. 9 shows a schematic top view of a MEMS device according to yet another embodiment of the present invention.

FIG. 9 shows a schematic top view of a MEMS device 100 according to another embodiment of the present invention. In this embodiment, the second part 26b of the linking elements 26 has a more complicated layout that it extends between the stopper 25 and the proof mass frame 21. Further, this embodiment shows that the stoppers 25 may include bumps 253 to further improve the buffering effect.

Figure 10:
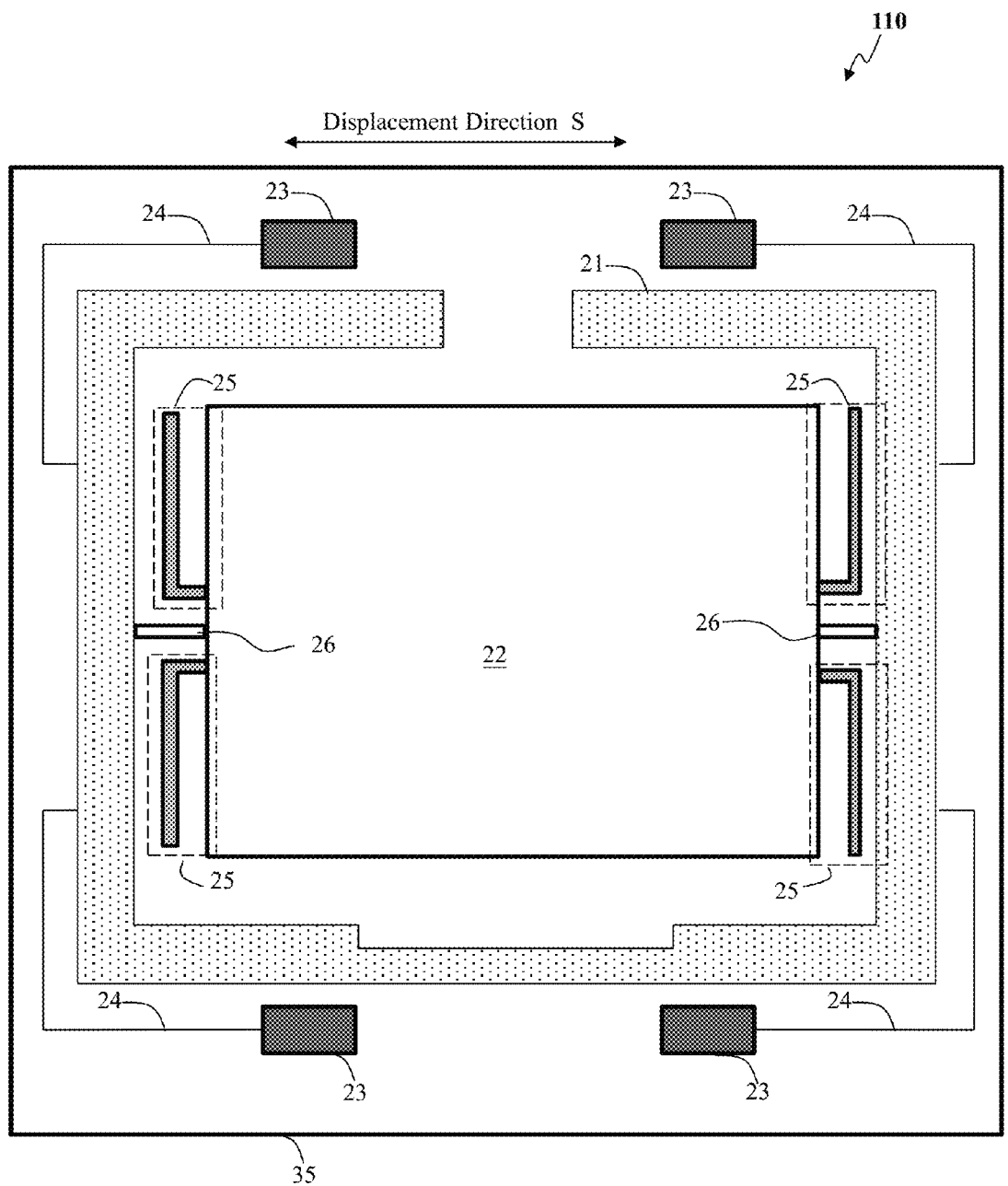
FIG. 10 shows a schematic top view of a MEMS device according to yet another embodiment of the present invention.
Figure 11:
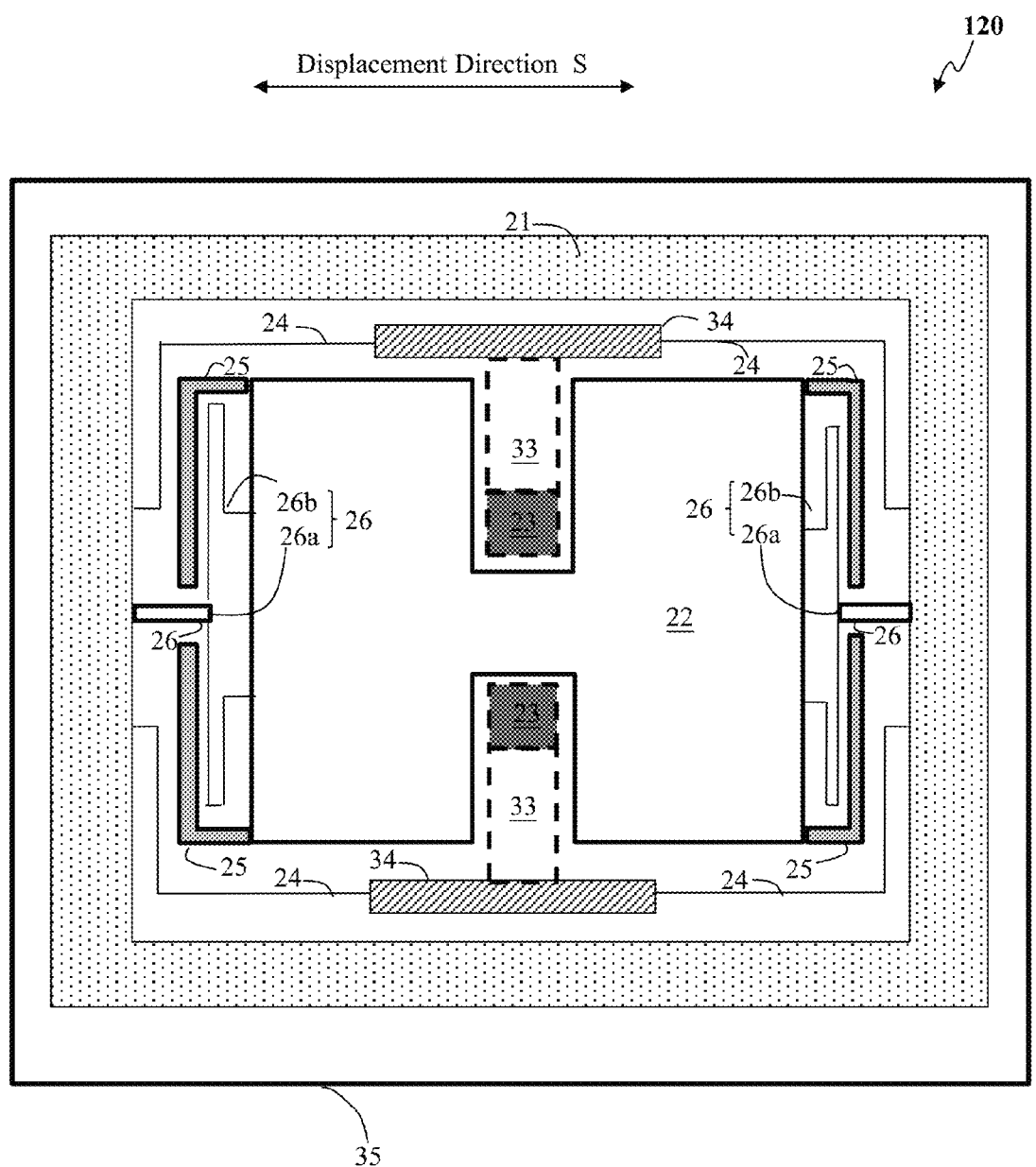
FIG. 11 shows a schematic top view of a MEMS device according to yet another embodiment of the present invention.

FIGS. 10-11 show two MEMS devices 110 and 120 according to two other embodiment of the present invention. In these embodiments, the stoppers 25 are connected to the proof mass body 22 instead of the proof mass frame 21.

Figure 12:
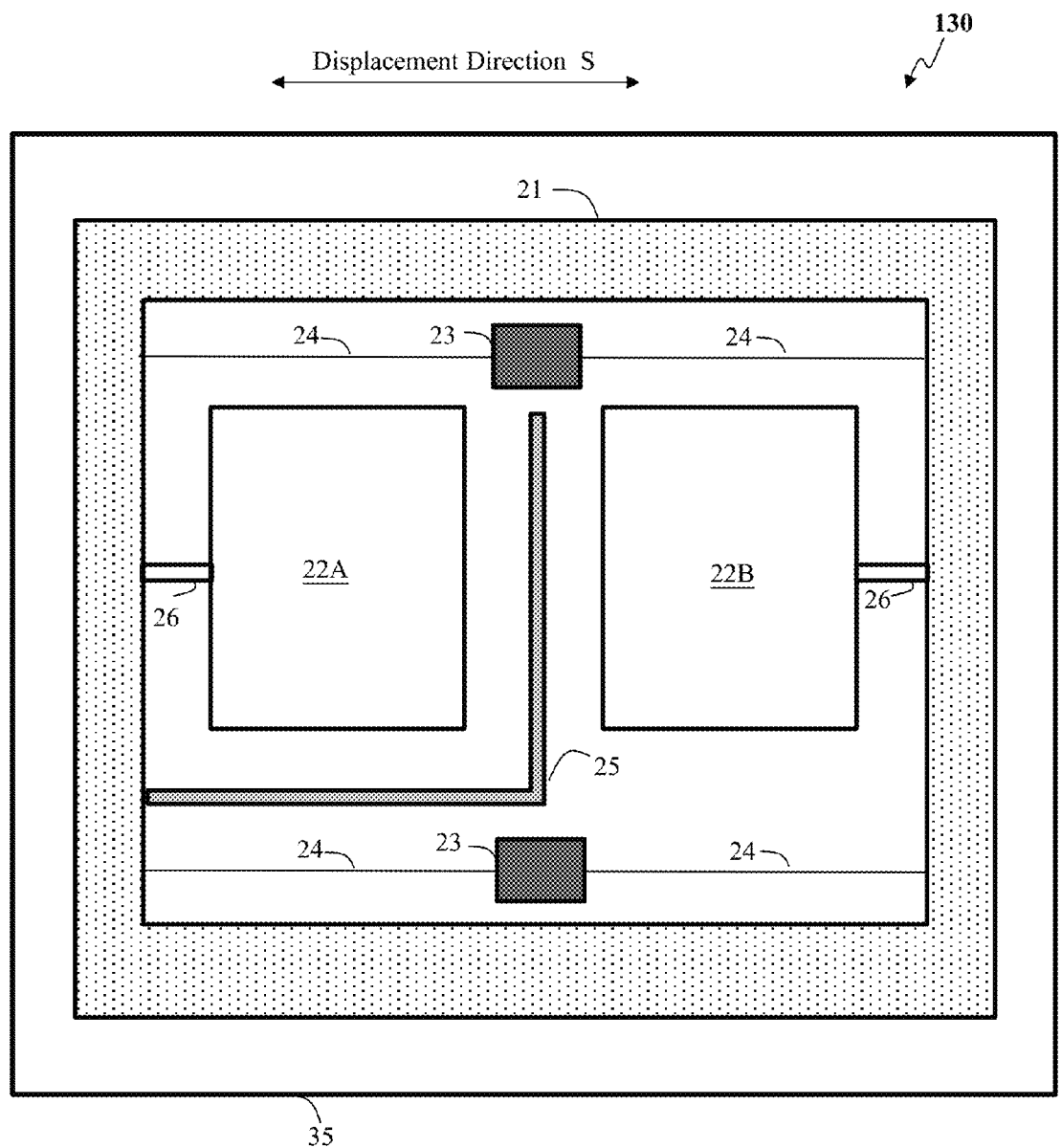
FIG. 12 shows a schematic top view of a MEMS device according to yet another embodiment of the present invention, wherein some of the components are omitted for simplicity of the figure.

FIG. 12 shows a schematic top view of a MEMS device 130 according to another embodiment of the present invention. In this embodiment, the MEMS device 130 includes two proof mass bodies 22a and 22b. A stopper 25 is provided between the proof mass bodies 22a and 22b in the displacement direction S, to limit the displacements of the proof mass bodies 22a and 22b. The stopper 25 is connected to the proof mass frame 21 and therefore contribute to the mass quantity of the proof mass. This embodiment shows that, when the MEMS device includes two or more proof mass bodies, one or more stoppers can be provided between these proof mass bodies in the displacement direction of the proof mass bodies. The embodiment of FIG. 12 can be combined with the embodiments of FIGS. 1-11, so that there are one or more stoppers provided between the proof mass bodies and also one or more stoppers provided between a proof mass body and the proof mass frame, in the displacement direction of the proof mass bodies.

Figure 13:
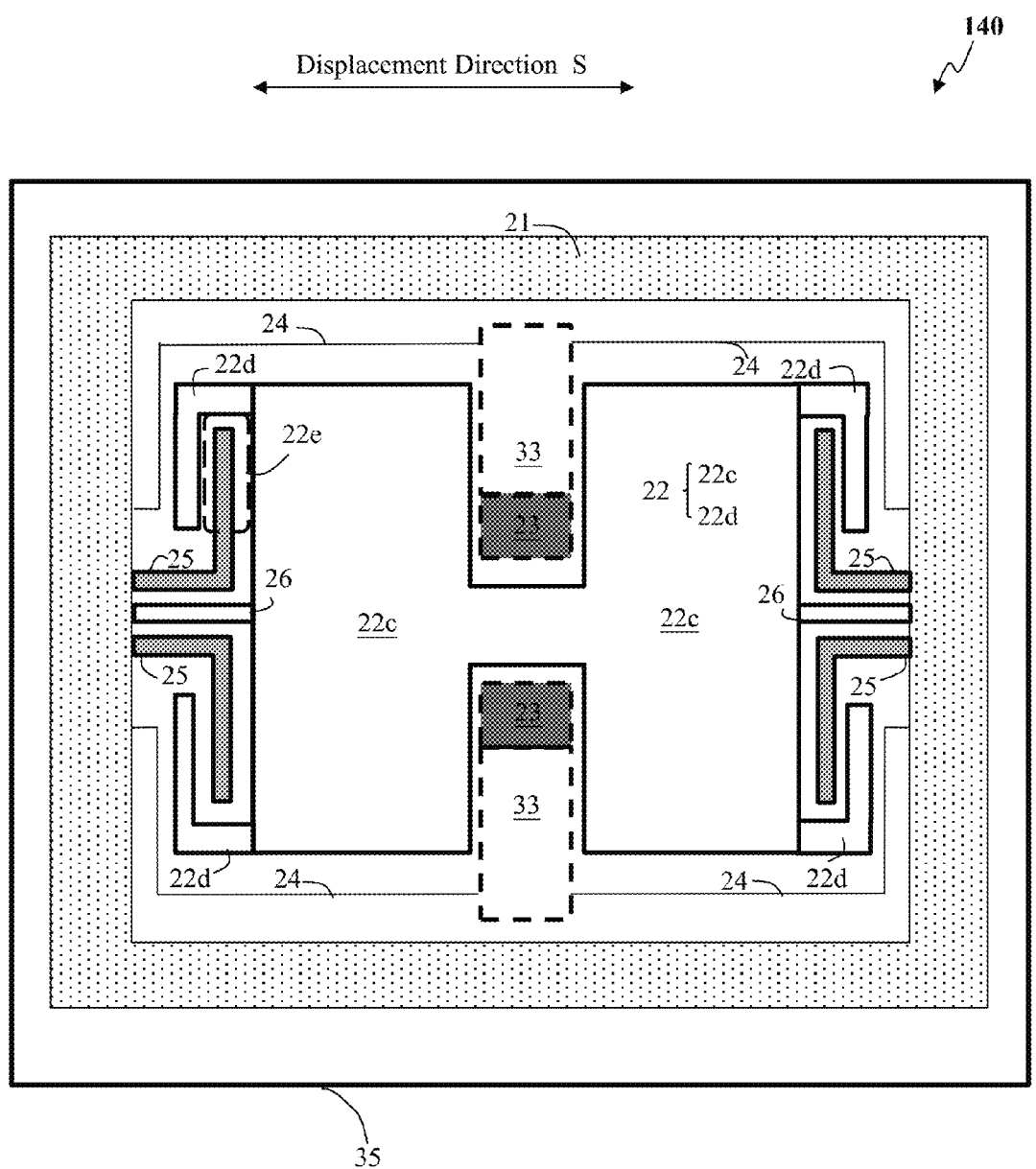
FIG. 13 shows a schematic top view of a MEMS device according to yet another embodiment of the present invention.

FIG. 13 shows a schematic top view of a MEMS device 140 according to another embodiment of the present invention. In this embodiment, the proof mass body 22 includes a main body 22c and at least one extending body 22d connected together. The main body 22c and the at least one extending body 22d form at least one internal space 22e. A stopper 25 is provided between the main body 22c and the at least one extending body 22d in the internal space 22e.

This embodiment shows that a stopper can be provided to extend into an internal space 22e formed within one proof mass body 22.

Figure 14:
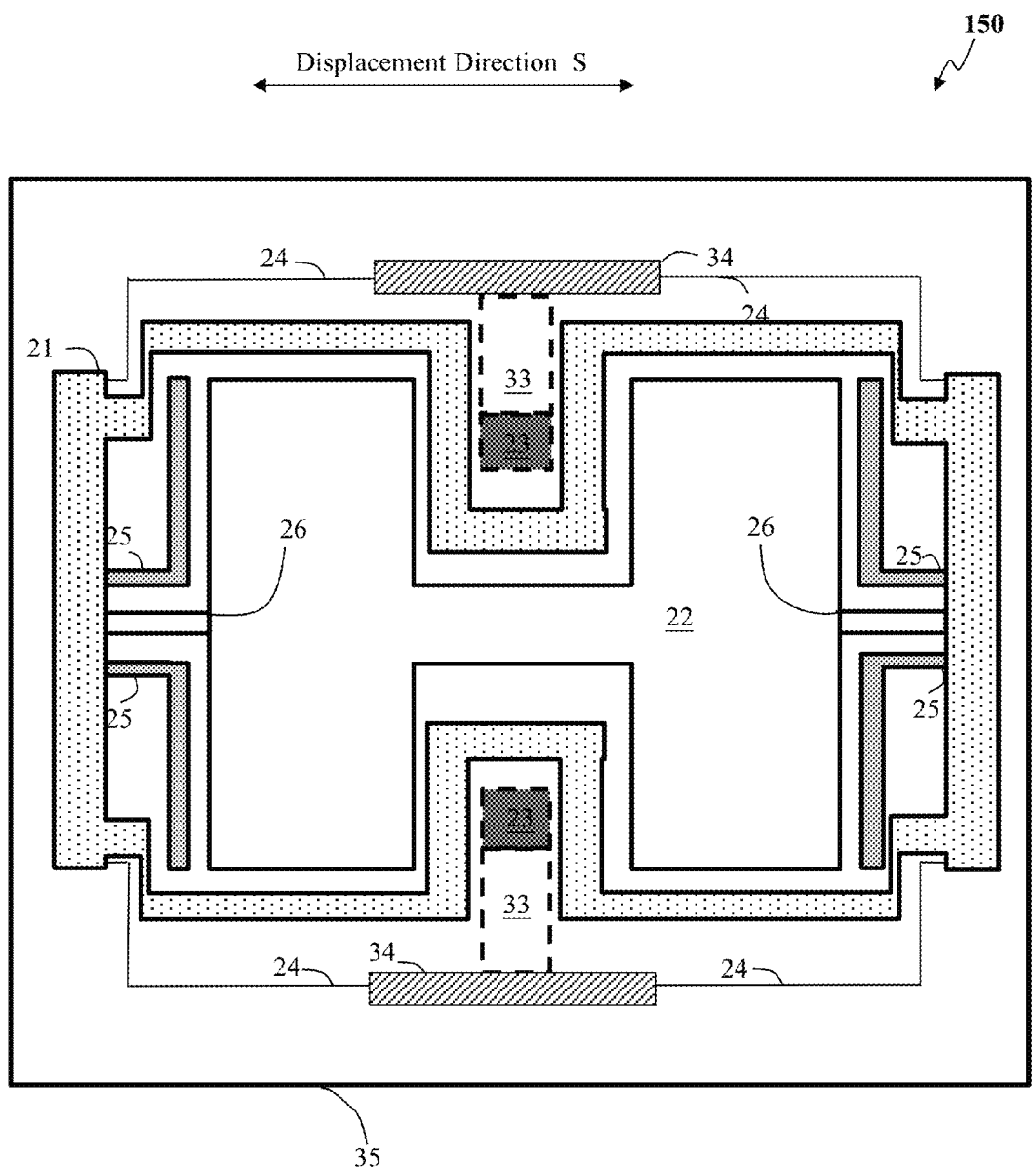
FIG. 14 shows a schematic top view of a MEMS device according to yet another embodiment of the present invention.

FIG. 14 shows a schematic top view of a MEMS device 150 according to another embodiment of the present invention. In this embodiment, the proof mass frame 21 extends between the proof mass body 22 and the anchors 23. The anchors 23, the connecting elements 33, the frame springs 24 and the buffering structures 34 are located outside of the proof mass frame 21. This embodiment shows that the proof mass frame 21 does not necessarily have to be a regular shape; the shape and layout of the proof mass frame 21 can be designed as desired.

In the above embodiments, only one-dimensional stoppers are shown. However, in light of the teachings by the present invention, if the MEMS device is a multi-dimensional sensor wherein the proof mass body can move multi-dimensionally, corresponding stoppers can be provided in the displacement directions.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A Micro-Electron-Mechanical System (MEMS) device, comprising:
    a substrate;
    a proof mass suspended above the substrate and is movable relatively to the substrate, wherein the proof mass includes:
        at least one proof mass body;
        a proof mass frame surrounding the proof mass body;
        at least one linking element connecting the proof mass body to the proof mass frame, the linking element providing a spring function so that the proof mass body is movable relatively to the proof mass frame in a displacement direction; and
        at least one stopper between the proof mass body and the proof mass frame in the displacement direction to limit the displacement of the proof mass body, wherein the stopper is connected to the proof mass frame or the proof mass body as a part of the proof mass and contributes to the mass quantity of the proof mass;
    at least one frame spring connected to the proof mass frame; and
    at least one anchor connecting one or more of the at least one frame spring to the substrate,
    wherein the stopper includes a first part extending in the displacement direction and a second part extending in a direction perpendicular to the displacement direction, the stopper being connected to the proof mass frame or the proof mass body by the first part, the second part being longer than the first part, and the second part having one end connected to the first part and another end open.

2. The MEMS device of claim 1, wherein the stopper is wholly made of a resilient material, or a part of the stopper which is connected to the proof mass frame or the proof mass body is made of a resilient material.

3. The MEMS device of claim 1, wherein the stopper as a whole, or a part of the stopper which is connected to the proof mass frame or the proof mass body, provides an impact buffering function by a shape of the stopper or a shape of the part of the stopper.

4. The MEMS device of claim 1, wherein the anchor is located outside the proof mass frame.

5. The MEMS device of claim 1, wherein the anchor is located inside the proof mass frame.

6. The MEMS device of claim 1, wherein the anchor is located below the proof mass body.

7. The MEMS device of claim 1, further comprising a buffer spring between the stopper and the proof mass frame in the displacement direction.

8. The MEMS device of claim 1, further comprising a buffer spring between the stopper and the proof mass body in the displacement direction.

9. The MEMS device of claim 1, further comprising a first buffer spring between the stopper and the proof mass frame in the displacement direction, and a second buffer spring between the stopper and the proof mass body in the displacement direction.

10. The MEMS device of claim 1, wherein the MEMS device comprises at least two proof mass bodies, and the MEMS device further comprises at least another stopper between the two proof mass bodies in the displacement direction.

11. The MEMS device of claim 1, wherein the stopper is connected to a side of the proof mass frame or a side of the proof mass body which is not parallel to the displacement direction.

12. The MEMS device of claim 1, wherein at least one of the linking elements includes a first part connected to the proof mass frame and a plurality of second parts connected to the proof mass body.

13. The MEMS device of claim 12, wherein at least one of the second parts provides a spring function, and the first part is relatively more rigid than this second part.

14. The MEMS device of claim 12, wherein at least one of the second parts extends between the stopper and the proof mass frame.

15. The MEMS device of claim 1, wherein the proof mass body has an internal space, and the stopper is connected to the proof mass frame and extends in the internal space.

16. A Micro-Electron-Mechanical System (MEMS) device, comprising:
    a substrate;
    a proof mass suspended above the substrate and is movable relatively to the substrate, wherein the proof mass includes:
        at least two proof mass bodies;
        a proof mass frame surrounding the proof mass bodies;
        at least two linking elements connecting the proof mass bodies to the proof mass frame, respectively, the linking elements providing a spring function so that the proof mass bodies are movable relatively to the proof mass frame in a displacement direction; and
        at least one stopper between the proof mass bodies in the displacement direction to limit the displacements of the proof mass bodies, wherein the stopper is connected to the proof mass frame as a part of the proof mass and contributes to the mass quantity of the proof mass;

at least one frame spring connected to the proof mass frame; and at least one anchor connecting one or more of the at least one frame spring to the substrate.

* * * * *